United States Patent [19]

Reitmaier

[11] 4,258,703

[45] Mar. 31, 1981

[54] ROOF AND WALL COVERING

[76] Inventor: Ludwig Reitmaier, Marktl, Fed. Rep. of Germany

[21] Appl. No.: 916,115

[22] Filed: Jun. 16, 1978

[30] Foreign Application Priority Data

Oct. 14, 1977 [DE] Fed. Rep. of Germany ... 7731861[U]
Nov. 4, 1977 [DE] Fed. Rep. of Germany ....... 2749490

[51] Int. Cl.³ .................................................. F24J 3/02
[52] U.S. Cl. ..................... 126/445; 126/442; 126/448
[58] Field of Search ............... 126/448, 445, 442, 444, 126/450; 165/168

[56] References Cited

U.S. PATENT DOCUMENTS

| 4,114,597 | 9/1978 | Erb | 126/901 |
| 4,123,003 | 10/1978 | Winston | 126/430 |
| 4,131,110 | 12/1978 | Jones | 126/426 |
| 4,144,874 | 3/1979 | Zebuhr | 126/448 |
| 4,150,661 | 4/1979 | Callegari et al. | 126/445 |

FOREIGN PATENT DOCUMENTS

2510321 9/1976 Fed. Rep. of Germany ........... 126/442

Primary Examiner—Carroll B. Dority, Jr.
Attorney, Agent, or Firm—Whittemore, Hulbert & Belknap

[57] ABSTRACT

The invention relates to a roof and wall covering, in particular for heat-insulating house walls or roofs, consisting of board-like hollow plastic sections with several through profile chambers extending in longitudinal direction and of edge profiles insertable flush into each other.

21 Claims, 13 Drawing Figures

ROOF AND WALL COVERING

The invention relates to a roof and wall covering, in particular for heat-insulating house walls or roofs, consisting of board-like hollow plastic sections with several through profile chambers extending in longitudinal direction and of edge profiles insertable flush into each other.

In view of the need to conserve energy, heat insulation of house walls and roofs in gaining more and more in importance. Independent thereof, it is also being recognized increasingly that the utilization of solar energy to produce usable heat can very well be economical even in regions with less sunshine, provided success is achieved in keeping the installation required for the purpose and the necessary maintenance costs for such an installation small. Plate-shaped solar cells are already being offered on the market which can be mounted on terraces, in the yard, on roofs or the like and which make it possible in various ways to absorb solar energy in the form of heat and thus heat a heat carrier fluid which transfers its heat in a heat exchanger to a water system for use. The water system may be connected to various heat consumer points in the home, in shops or the like.

Such installations are still expensive to produce and acquire, and they are also considered an eyesore when mounted on terraces, in the yard, or on roofs.

It is an object of the invention to overcome these difficulties and to provide a wall and roof covering which can be applied in particularly simple and inexpensive manner in place of other coverings, at the same time contributing considerably to the heat insulation of the walls or roofs while at the same time permitting effective utilization of solar energy for the generation of heat.

In essence, this problem is solved in that a roof and wall covering consisting of board-like, hollow, plastic sections, each with several profiled through chambers and edge sections insertable flush into each other is used, and in that the solar energy, either absorbed by the hollow sections themselves and transformed into heat and/or the air layers heated on the outside surface of such covering by the sun rays are utilized for the generation of heat, the profile chambers of the hollow sections being used at the same time as duct system.

Air or another gas, or also a fluid may be used to advantage as heat carrier. The heated fluid is attracted by a pump and—possibly with the interposition of a heat pump—fed to a heat exchanger in that the heat is transferred to the circulating fluid of a consumer heat circulation preferably equipped with a heat reservoir.

To start with, the hollow sections must perform the job of a conventional wall or roof covering. They represent a weatherproof, easy-to-care-for, rugged cover for walls or roofs. Due to their design as hollow sections, the covering forms at the same time a highly effective heat insulation for the wall or roof surfaces, and that as far as both heat radiation from the outside and heat emission from inside the building is concerned. The covering thus performs at the same time an important heat insulation function. But thirdly, the covering has the additional important function of forming with the profile chambers of the hollow plastic sections a simple, safe collecting and conducting system for the fluid transporting the heat gained from the solar energy.

The hollow plastic sections can be installed on appropriate wall or roof bases particularly simply, safely and without any damage to the hollow sections by means of special clamping elements. In view of the multiple function of the covering, production and installation as well as upkeep of the covering and the related systems are extremely simple.

The invention is explained below in greater detail by way of several embodiment examples with reference to schematic drawings, of which

Figure 1:
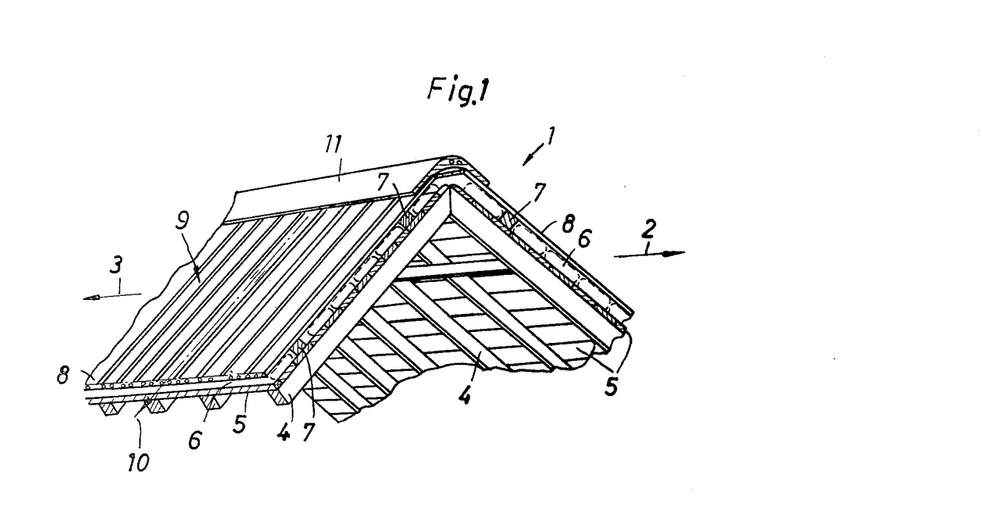
FIG. 1 is a perspective view of a portion of a regular residential roof with heat barrier, FIG. 2 in larger scale, partly in section and otherwise in perspective view, several juxtaposed hollow section parts of the roof covering according to the invention, FIG. 3 a detail in vertical section along a profile chamber of a hollow section part of the new roof covering.

The roof 1 shown in FIG. 1 has a covering according to the invention. The roof may be designed in the usual manner with appropriate roof pitch and have two roof surfaces inclined relative to each other, one facing North in the direction of arrow 2 and the other South in direction of arrow 3.

The roof consists of rafters 4, a layer of board, 5, on top of that a layer 6 of insulating material and horizontally aligned furring strips 7 serving to fasten the actual roof covering 9. The roof covering 9 consists of individual, board-like, plastic, hollow section parts joined to each other mechanically and moistureproof by means of a tongue and groove connection. The pitch line of the roof surface 9 is indicated by the arrow 10, while the two roof surfaces are covered jointly by a ridge section 11.

Both roof surfaces consist of the same board-like, hollow section parts 8 so that the roof surfaces are of uniform appearance over their entire extent.

Figure 2:
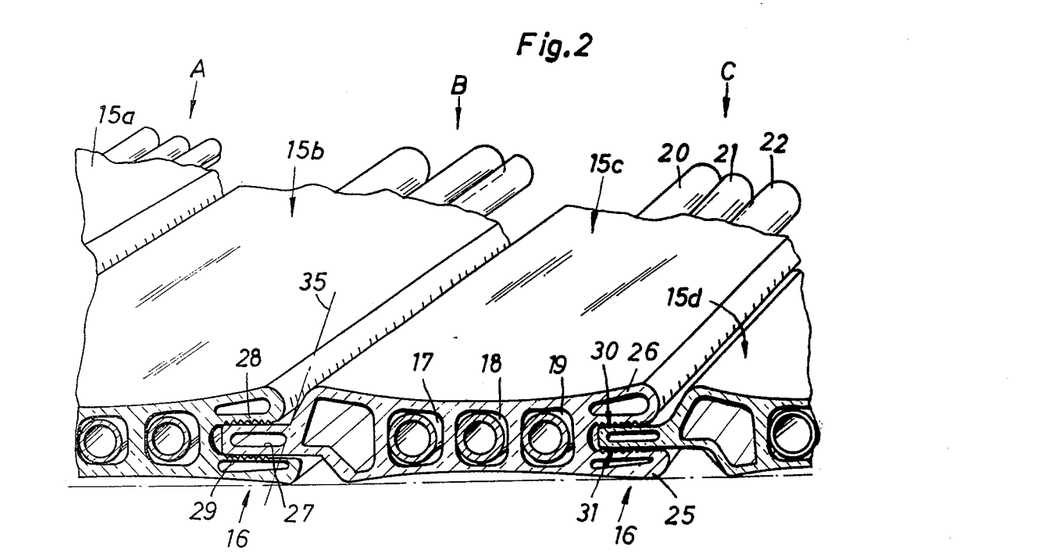

The design of the individual hollow section parts is demonstrated best in FIG. 2. Each hollow section part has upper and lower flat sides concaved towards the outside (sic). This gives the board-like, plastic, hollow section parts extraordinarily great stability, further supported by the division of the interior of each board-like hollow section part into several profile chambers extending in longitudinal direction and being completely separated from each other by webs inbetween them. The profile chambers have the reference symbols 17, 18, 19 while the board-like section parts are differentiated between by being numbered 15a to 15d.

Each section part has on one long edge two lips 25, 26, designed as hollow sections and bounding between them an engagement groove extending in longitudinal direction for the connection to a web-shaped tongue section 27 extending along the other long edge and likewise designed as hollow section. The mutually facing inside surface of the sections 25 and 26 limiting the groove have a lengthwise oriented serration 28, 29, whereas the web-like tongue is essentially smooth, merely having near its free end on the top and bottom side one or two single fine teeth 30, 31 extending in lengthwise direction. During the installation, the lower section 25 of the example illustrated is nailed to the furring strips 7 by means of a few nails hammered into part 25 in the manner indicated by the dash-dotted line 35. Then the tongue 27 of the adjacent hollow section part is pushed into the groove of the previously fixed section part, the parts 25 and 26 giving elastically during this assembly operation so that the teeth 30, 31 snap into the appropriate serration of parts 25 and 26 in the final engaged position. In this manner an adequate seal, also against moisture, is assured for most applications. But if required, an additional packing may be inserted in or assembled to the bottom of the groove to cooperate with the face of the tongue 27 as a seal in assembled condition. However, an elastic sealing lip assuming the sealing function may also be molded to the bottom of the groove when the hollow sections are produced.

The hollow section parts 15a to 15d of the example illustrated consist of a highly impact resistant plastic colored dark through and through, preferably blackened with about 2 to 6% chemical carbon black, in particular of highly impact and weather resistant polyvinylchloride. Practice has shown that such colored plastics practically do not loose their color even when constantly exposed to the atmosphere, specifically they will not bleach out.

The entire roof surface is covered with the hollow section elements shown, it being possible to orient the covering parallel to the pitch line 10, as shown in FIG. 1, or transverse thereto. In the latter case, the hollow section parts are oriented so that the tongue sides point upwardly. In such cases, additional sealing is not required, even in extreme situations.

The entire roof surface roughly facing South, or parts of this roof surface are at the same time designed to generate heat by solar energy absorption. Experience in practice has proven that the black colored plastic is capable to a considerable degree of absorbing and converting into heat considerable amounts of solar energy, even in diffuse sunlight. In the example illustrated, this heat is transferred to a fluid, in particular water or water enriched by additives, which is conducted through the profile chambers 17 to 19. The water is introduced to the profile chambers 17 to 19 in a suitable place and removed from the profile chambers in another appropriate place.

Figure 3:
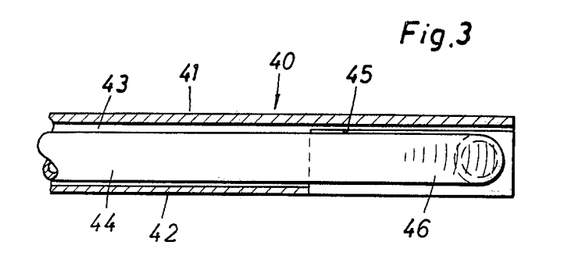

If applicable, the fluid is conducted through the profile chambers 17 to 19 not directly, but through ducts 20 to 22, inserted in turn into the profile chambers 17 to 19 loosely or by using a filler so that physical contact between the ducts and the limiting walls of the profile chambers sufficient for the heat transfer is provided. The ducts 20 to 22 may go through all profile chambers of each hollow section part on the sunny side of the roof surface. But it is also possible to provide selected hollow section parts only or selected profile chambers in one and the same hollow section part with ducts. All suitable hollow section chambers 17 to 19 in the example shown are equipped with duct groups A, B and C. To be able to lead the ducts several times over the length of the hollow section parts without special connections or junctions, the hollow profile parts may have at their ends, as FIG. 3 shows for section part 40, or at any other point between their ends, a cutout 45 on the bottom side 42, through which a knee 46 of tube 44 is led laterally from one hollow section part to the next. 41 is the top side of the hollow section part and 45 a limiting web for the profile chamber shown.

Figure 4:
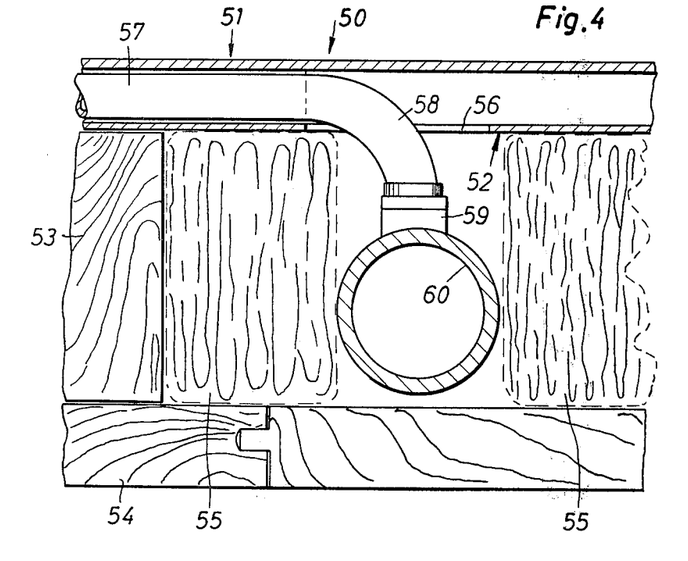
FIG. 4, in a view similar to FIG. 3, a modified embodiment.

As shown at 58, the tube sections 57 may also be led out of the roof plane downward through an appropriate cutout 56 on the underside of the hollow section parts 50 by bending it, and be reintroduced in corresponding manner into the next hollow section part through a U-bend, or, as shown, be connected to a distribution or collecting line 60. 51 is the outside of the roof, 58 the tube knee, 53 a rung-like strip corresponding to strip 7 in FIG. 1, 54 the sheathing, 55 a heat barrier and 59 the tube connection to the distribution or collecting line. But special connector sections to accept the rerouting or connecting tube sections may also be provided at the end of the roof. For instance, close-off plugs may be ultrasonically fused or cemented into the sections. They may have at least one connector element for a tube connection. If the preceding discussion involved plastic section parts with profile chambers going through in longitudinal direction, this is to include also the case where the section comprises at least one single through profile chamber.

Figure 5:
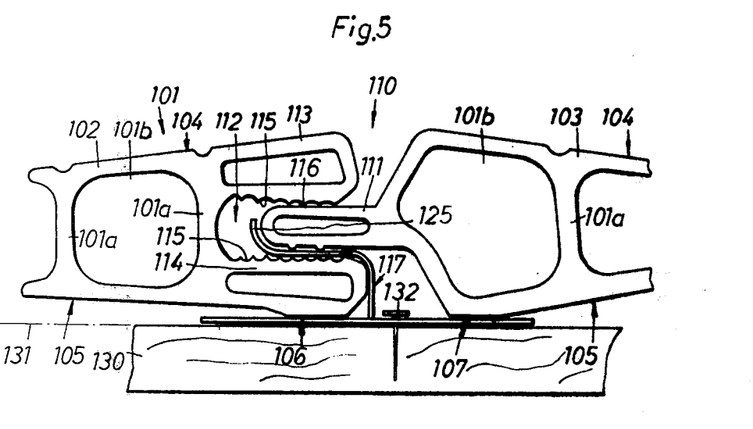
FIG. 5 the connection between two adjacent hollow section in a preferred embodiment, FIG. 6, in various views, the clamping element used in FIG. 5 to connect the hollow section parts, FIG. 7, in vertical section, a roof covering according to another embodiment example of the invention, FIG. 8 details of the roof covering according to FIG. 7 in cutout and in perspective view, FIG. 9 a preferred embodiment of the board-like, hollow section used and an extension or connection, FIG. 10, in larger scale, a longitudinal section of a terminal or connecting section, FIG. 11, in cutout and perspective view, a modified embodiment example of the hollow section, FIG. 12 a further modified embodiment example of the hollow section in cross-section, and FIG. 13, in schematic representation, a heat pump space heater for the embodiment example of the roof covering according to FIG. 7.

It may be seen in the covering according to FIG. 5 that the hollow sections 101 have cavities 101b separated by webs 101a and that they are concaved on their top side 104 and their bottom side 105. Through nodal points the webs 101a are integrally joined to the top and bottom walls. The result of extensive testing has been that the sections described so far meet extremely high requirements as to impact strength, bending strength and weather resistance.

Each hollow section 101, of which the mutually joined long sides of two adjacent hollow sections 102 and 103 are illustrated, have on one long side each a tongue-like section 111 which is provided on its top and bottom side with, say, two mutually spaced, fine, lengthwise teeth 116. Provided on the other long side of the hollow section is a grooved section consisting of an upper lip 113, a lower lip 114 and a groove 112. The inner boundary walls of the groove are provided with fillet-like recesses 115 running in longitudinal direction, to be engaged by the fine teeth 116, the dimensions of the fillets and fine teeth being selected so that even in the event of heat expansions transverse to the longitudinal direction of the hollow sections, the fine teeth will remain uniformly in the same fillet 115, i.e. without jumping into the adjacent fillet, which could result in undesirable noises. Only one lengthwise tooth 116 may be provided on the top and bottom side. But two mutually spaced teeth 116 help prevent a hinge effect at the connecting point 110.

Each hollow section has on its concave underside 105 two strip-shaped glide surfaces 106 and 107 in the area of the side edge profile. These glide surfaces 106 and 107 lie in a common plane and form the support for the respective hollow section on the seating surface 131 of a base 130. But in the example shown, the glide surfaces 106 and 107 do not interact directly with the seating surface of the base 130, but with the top side of a plate-shaped section 118 of a clamping element 117 which can be placed on the base 130.

Figure 6:
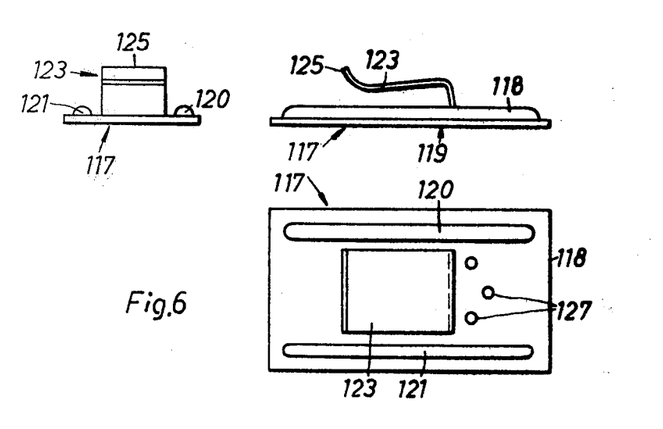

Each clamping element has a clamping section 123 lanced out of the plate-shaped section 118, bent up in hook form, and its free end bent away from the plate-shaped section 118, as indicated at 125.

In the example shown, the plate-shaped section 118 is rectangular in top view and has deformations in the form of longitudinal ribs 120 and 121 to increase the bending strength of the plate-shaped section, the ribs jutting out away from the base 130 in the example shown. The lengthwise extent of the plate-shaped section 118 is such that, in assembled condition, the reinforcing ribs 120 and 121 of the plate-shaped section 118 protrude on both sides of the connecting point 110 beyond the glide surfaces 106 and 107 of the adjacent hollow sections so that the glide surfaces 106 and 107 of the hollow sections 102 and 103 support themselves on the ribs 120 and 121. The ribs thus form glide supports for the glide surfaces 106 and 107, permitting a noiseless heat expansion motion of the hollow sections transverse to as well as in longitudinal direction of the sections.

The clamping elements may consist of plastic, but preferably of zinc-plated sheet metal parts.

To install the roof or wall covering, two or more than two clamping elements 117 are pushed at intervals over the upper lip 114 of the profile groove section of the hollow section 102 until the free face of lip 114 stops against the foot section of the hook-shaped clamping part 123. As the side view in FIG. 6 shows, the clamping part 123 may be formed so that it can be pushed over the lip 114 under a predetermined preload.

When pushing the clamping part over the lip 114, the glide surface 106 of the hollow section 102 will rest on the reinforcing ribs 120 and 121. As may be seen from the top view of FIG. 6, the base portion 118 of the clamping element has several holes 127, through which the clamping element can be nailed to the base 130 by means of nails 132, as indicated in FIG. 5. Now the tonguelike section 111 of the adjacent hollow section 103 can be pushed into the groove 112. The depth to which it can be pushed in is limited by the stoplike, formed portion 125 at the free end of the clamping part 123. This simplifies the installation work considerably and assures that the visible joint along the connecting point 110 is of the same size and shape everywhere. When sliding in the section 103, the glide surface 107 of this section again rests on the rib-like reinforcements 120 and 121 of the clamping element 117. Depending on the number and mutual spacing of clamping elements 117 distributed over the length of the hollow sections it can be assumed that essentially the narrow glide surfaces 106 and 107 of the hollow sections only rest on the base sections 118 of the clamping elements so that a direct contact with the base 130 can be avoided. But this is not absolutely necessary. After the installation, all hollow sections can freely expand or contract in transverse as well as longitudinal direction when temperatures change, without tensions occurring in the sections themselves. Expansion noises are virtually precluded through this system. Therefore, a stable, troublefree roof covering of great strength and high quality is thus obtained.

Figures 7, 8:
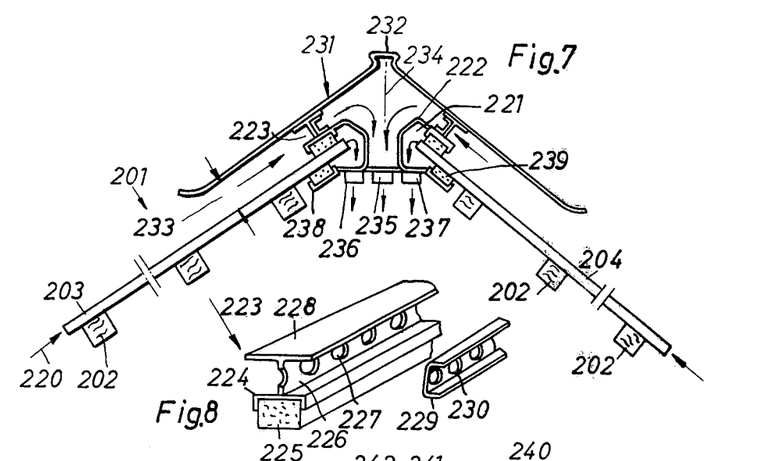

Shown in FIG. 7 is a roof and wall covering according to another embodiment example of the invention. On a conventional base not detailed, of which only nailing strips 202 are shown, the roof covering 201 has two roof surfaces 203 and 204, each formed of boardlike, hollow, plastic sections. Each hollow section 205 again has a concave outside surface 206 and a concave underside 207 according to FIG. 9, on which glide surfaces 208 and 209 are provided. The profile chambers have the reference symbol 210, the tongue-like edge profile 211 and the groove-like profile limited by two hollow lips 203 and 214 is marked 212.

It is again assumed in the example shown that each hollow section consists of a plastic colored dark, preferably black through and through by means of a filler.

The lower ends of the hollow sections are open, preferably towards the external ambient atmosphere so that the outside air canenter the profile chambers 210 at 220 in the area of the lower roof edge. The hollow sections 205 end short of the ridge line of the roof and are open at these ends also. The open ends of the hollow sections are enclosed in the ridge area by housings 222 which extend parallel to the ridge and bound an air collection chamber 221. Provided on the long edges of housing 222 are retaining sections 224 and 238, respectively, for elastic sealing strips 225 and 239 which rest elastically on the top and bottom side of the covering and seal the air collection chamber 221 towards the outside and the inside without interfering with the heat expansion motions of the hollow sections 205.

The two air collection chambers 221 of the two roof surfaces 203 and 204 are preferably separated from each other and have separate nipples 236 and 237 for the connection of a suction line. The latter leads to the intake side of a heat pump connected to a space heating system via a heat exchanger. This may involve any known space heating system.

The air entering the profile chambers 210 at 220 is sucked at low velocity through the profile chambers 210 upwards into the collecting channels 221 and conducted to the heat pump. In the process, the air heats up greatly, depending on the sunlight. Since practically all profile chambers of all the hollow sections can be connected to the heat pump, a great quantity of heated air is available, from which heat can be gained via the heat pump and transmitted to the space heating circuit. The space heating circuit may also contain appropriate intermediate heat storage facilities for cooler times of the day.

It may be expedient in some cases to use additionally a liquid heat carrier medium also, which absorbs the heat from the hollow sections as in the first embodiment example. In such a case, some of the profile chambers 210 may be connected directly or through the insertion of hoses or tubes 245 (see FIG. 9) to the circulation of a liquid heat carrier kept in motion by a pump.

Instead of to the outside atmosphere, the lower open ends of the hollow sections 205 may also be in open connection to an inside room of the house in order to conduct the inside air through the hollow sections, thereby heating it by utilizing solar energy.

The hollow sections of all embodiment examples can be used also in the same manner for a wall covering instead of a roof covering. If the wall in question is exposed to the sun's rays, the heat absorbed by the hollow sections can be utilized by a heat pump via an air circulation in the same manner as indicated in FIG. 7.

It can often be observed that sun rays will greatly heat up an air layer located directly above the outside of the roof or the outside of the wall and almost resting on the roof or wall surface. In order to utilize this heat also, the covering may be equipped with devices to suck up the heated air layer.

Sucking up the outer hot air layer is accomplished in the embodiment example according to FIG. 7 by a hood 231, disposed along and spaced from the ridge of the roof, covering the outside of the roof surfaces 203 and 204. This forms an entry channel 233 for the hot air layer. In the example shown, the hood 231 is supported by T-brackets 223 mounted or molded to the outer holders 224 of the housings 222. The outer flange 228 serves to brace the hood 231 while the web 226 is provided with holes 227 for the passage of warm air. A slide 229, likewise equipped with holes 230 and operable selectively or automatically by temperature probes, may be coordinated with the web 226. Air entry under the hood 231 can either be opened up, throttled or shut off completely by means of this slide. A collecting channel 234 for the hot air sucked in forms between the webs 226 of the two housings 221. This collecting channel has a separate suction nipple 235 which is connectable to the heat pump. If separate valve flaps or similar valve mechanisms are coordinated with each of the nipples 235, 236 and 237, the slide 229 can be obviated. The adjustment of the valve flaps permits optimal mixing of the air components from the various suction areas prior to being supplied to the heat pump. The hood 231 may have a hinge-like section 232 so that one and the same hood may readily be adapted to different roof pitches.

To be able to connect the hollow sections 205 to each other in longitudinal direction or to equip them with connecting nipples for a liquid heat carrier medium, hollow slide sections 240 and 250, respectively, (see FIGS. 9 and 10) are provided. They have a center section 241 and 255, respectively, whose contour and profile are identical with the contour and profile of the hollow sections. Protruding from this center section at least to one side, preferably to both sides, are plug-like sections 242, 243 whose contour and profile correspond to the cross-sectional area of the openings of the profile chambers. In this manner, the ends of the hollow sections 205 can be plugged to the plug-shaped sections with the interposition of a binder so that a sealed, firm connection can be established. The hollow terminal or connecting sections 240 and 250, respectively, do not interfere with the flow in the profile chambers.

Figure 10:
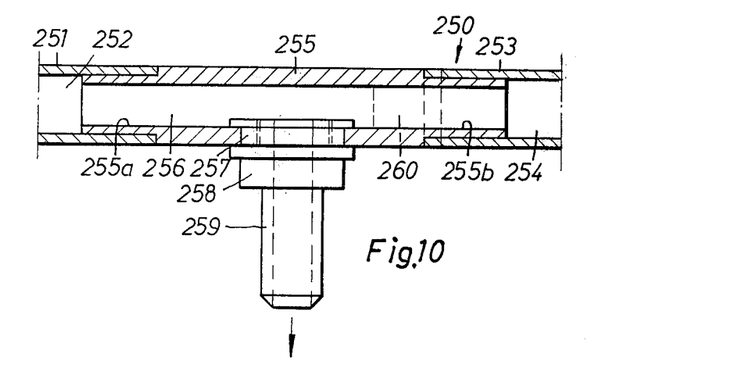

If the sections such as section 240 serve only to connect or extend the hollow sections, the center section 241 is designed narrow in longitudinal direction only. But if the sections such as section 250 also serve to make line connections, the center section 255 is designed correspondingly wide. As FIG. 10 shows, a connecting nipple 258, 259 is inserted by means of a tapped ring 257 into the lower wall of the hollow connecting sections at 256 so as to be sealing. By means of plug-shaped extensions 255a and 255b, a hollow section 251 and 253, respectively, whose profile chambers 252 and 254 communicate with the hollow interior 256 of the connecting section 250 can be plugged to the latter. But the connection section may also be closed off on one side by a plug, such as indicated at 260 in FIG. 10.

Figure 9:
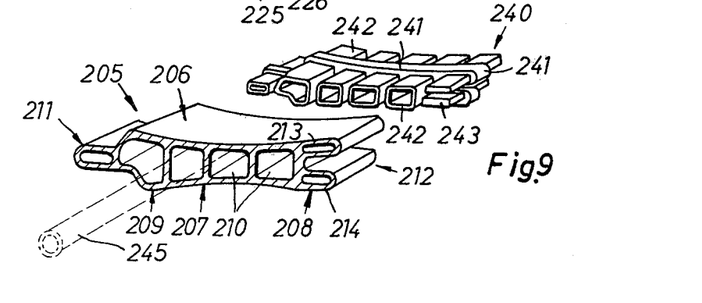
Figure 11:
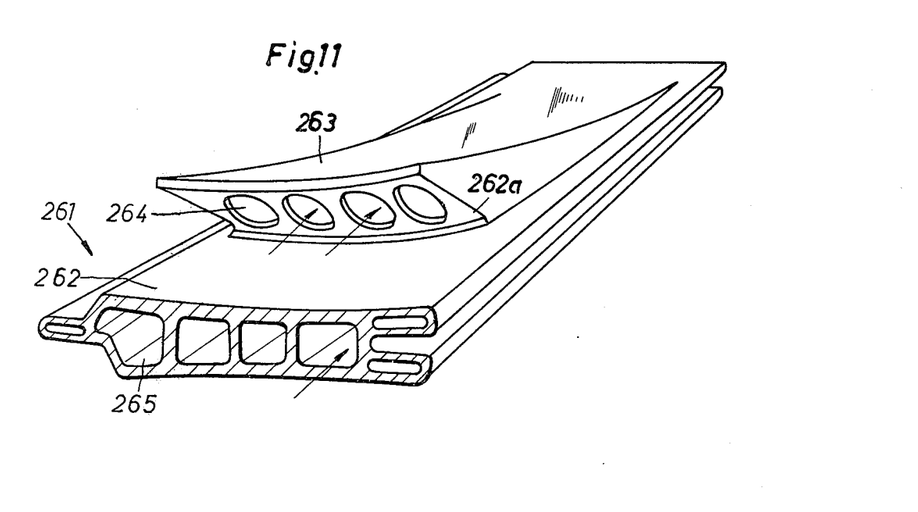

To attract outside air directly above the outside of the hollow sections, the hollow sections themselves or else connecting sections such as the sections 240 or 250 according to FIGS. 9 and 10 may be provided with projections 263 jutting outwardly like a bay window, such as indicated in the hollow section 261 according to FIG. 11. The bay window projections 263 of the hollow section 261 are located on the top side 262. The projections 263 rise tangentially from the surface 262 outwardly and terminate in an undercut face 262a. This undercut face 262 is provided with holes 264 or else with weakened wall areas of appropriate contour which can either be pushed in easily or be cut out with a tool to open up certain holes 264 selectively. The holes 264 terminate in hollow chambers of the projection 263 and are in flow connection with the profile chambers 265 of the hollow section 261.

In this manner, a certain portion of the air layer resting directly on the outside of the hollow section can be sucked into the interior of the hollow section.

Figure 12:
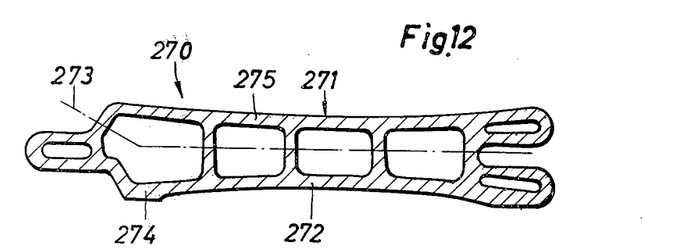

It has proven to be particularly advantageous for all embodiment examples if each hollow section is made of plastics having different ray absorption powers. One example of this is shown in FIG. 12. In essence, the hollow section 270 has the same cross-sectional area as the hollow section according to FIG. 9. The top surface 271 and the underside 272 are both concaved. The wall 275 forming the top surface 271 consists of a plastic with but poor ray absorption power. This may involve a PVC of noticeable or good light transmittance. The lower half of the section consists of a well absorbing plastic such as a PVC colored dark, in particular black, by fillers. The border line between the two wall areas 274 and 275 of different ray absorption power may, as indicated by a dash-dotted line at 273, for instance, run along an essentially horizontal plane bisecting the profile chambers. In this embodiment, the solar energy is absorbed mainly in the lower area of the section and transmitted to the heat carrier (air or fluid). In this process, the outside wall 275 heats up relatively little. The same applies to the air layer on the outside surface 271.

Figure 13:
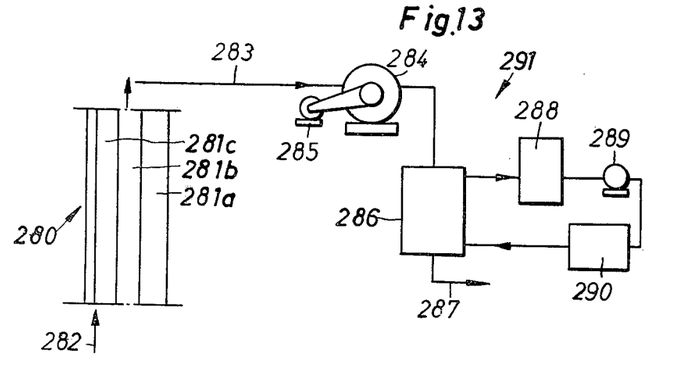

FIG. 13 shows schematically the layout of a room heating system designed by using the new roof or wall covering. At 280 is shown a roof or wall covering assembled of several board-like, hollow, plastic sections 281a to 281c in which air can enter the profile chambers of the hollow sections at 282. At the other end of the hollow sections the air is sucked off, collected and conducted through line 283 to the intake of a heat pump 284 driven by an electric motor 285, for example. The heat thus generated is transmitted in a heat exchanger 286 to a circulating heat carrier while the originally attracted air is led into the open or removed for further use at 287. The heat circulation may contain a heat reservoir 288. It belongs to the space heater 291. The heat carrier, such as a fluid heat carrier, is kept circulating by the pump 289 and flows through the radiators 290. After leaving the radiators 290, the heat carrier flows back to the heat exchanger 286 again.

But the heat generated and emitted by the heat pump 284 may also be transmitted to the air of an air space heater.

When hollow sections are used which are clear or transparent on the outside it may be expedient to employ as heat carrier a fluid colored dark, in particular black. This applies in particular to the arrangements where hoses or tubes to conduct the heat carrier are inserted in the profile chambers of the sections. The heat absorptivity and with it the efficiency of the arrangement can yet be considerably improved by coloring the heat carrier dark. Since the heat carrier is circulated as a rule, it need be colored dark practically once only.

I claim:

1. Roof and wall covering, in particular for heat-insulating house walls or roofs, consisting of board-like hollow plastic sections having outwardly and inwardly oriented section walls which are concave and with at least one web connected to the section walls forming each hollow section into at least two through profile chambers extending in a longitudinal direction and each section having a tongue along one edge and a groove along an opposite edge for tongue and groove connection between adjacent sections, characterized in that at least one of the profile chambers is designed as a duct section or is equipped with a duct section and that the duct section is connected with a pump circuit for a heat absorption fluid.

2. Roof and wall covering according to claim 1, characterized in that the hollow plastic sections, at least in the areas opposite the outwardly oriented section walls, consist of a plastic colored dark.

3. Roof and wall covering according to claim 1, characterized in that the hollow plastic sections, in the area of the outwardly oriented section walls, consist of a plastic of poor sun ray absorptivity.

4. Roof and wall covering according to claim 1, characterized in that the profile chamber which is one of designed as a duct section or equipped with a duct section of several juxtaposed hollow sections are selectively connected with the pump circuit in one of parallel to each other and in series one after the other via connecting devices.

5. Roof and wall covering according to claim 1, characterized in that selected profile chambers of the hollow sections, which are one of designed as a duct section or equipped with a duct section, form with a pumping device a closed circulation for a fluid heat exchange medium in the pump circuit.

6. Roof and wall covering according to claim 1, characterized in that the profile chambers which are one of designed as a duct section or equipped with a duct section are combined to form several separate heat exchange flow circuits.

7. Roof and wall covering according to claim 1, characterized in that at least one of the profile chambers of a single or all hollow plastic sections is designed with one end open towards the inside or outside atmosphere while the other end is connected to the intake side of a heat pump, in particular of a heat pump space heater.

8. Roof and wall covering according to claim 1, characterized in that at least one of a terminal section and connecting section is coordinated with each end of the hollow sections.

9. Roof and wall covering according to claim 8, characterized in that the terminal and connecting sections are designed to connect selected profile chambers to at least one of each other and the pump circuit.

10. Roof and wall covering according to claim 1, characterized in that when the profile chambers are equipped with a duct section the duct section consists of a pressure hose or a metal tube.

11. Roof and wall covering according to claim 1, characterized in that each hollow section has on its inwardly oriented section wall, which is concaved over the width of the section, two flat glide strips located in the bearing plane and respectively adjacent to the opposite edges of the section.

12. Roof and wall covering according to claim 1, characterized in that two or more than two clamping elements are provided which are distributed over the length of one edge of each hollow plastic section, clamping the section over the one edge and having holes for one of nailing or screwing to a base.

13. Roof and wall covering according to claim 12, characterized in that each clamping element has a plate-shaped section.

14. Roof and wall covering according to claim 13, characterized in that the plate-shaped section of each clamping element has deformations, in particular seating ribs which deformations extend transverse to the longitudinal direction of the point of connection to the hollow plastic section, reinforcing the section.

15. Roof and wall covering according to claim 13, characterized in that a hook-shaped section is lanced and bent out of the plate-shaped section of the clamping element, and that each clamping element has a stop limiting the engagement depth of the connecting devices.

16. Roof and wall covering according to claim 1, characterized in that the inwardly oriented section walls forming part of the profile chambers have cutouts for connecting sections.

17. Roof and wall covering according to claim 1, characterized in that terminal or connecting sections are provided for each hollow plastic section consisting of a hollow center section of a profile matching the hollow section and of plug section lengths which project from the latter in longitudinal direction of the hollow sections and have a hollow profile matching the profile chambers.

18. Roof and wall covering according to claim 17, characterized in that the center section has an inside wall and that a duct connecting element for the pump circuit is inserted and sealed in the inside wall of the center section.

19. Roof and wall covering according to claim 1, characterized in that there are provided on the outwardly oriented section walls of one or more hollow plastic sections devices to suck off selectively the air layers directly on the outside surface of the hollow plastic sections.

20. Roof and wall covering according to claim 19, characterized in that selected hollow section lengths have at least one section each which projects outwardly like a bay window, with air entry holes exposable selectively in an undercut wall area.

21. Roof and wall covering according to claim 19 wherein the hollow plastic sections are arranged in the form of a peaked roof with the duct sections extending vertically, characterized in that there is provided in the area of the roof ridge a long ridge cover with air entry holes closable selectively directly above the outside of the roof, said ridge cover having a separate suction connection for air from the connecting hollow plastic sections.

* * * * *